Figure 1:
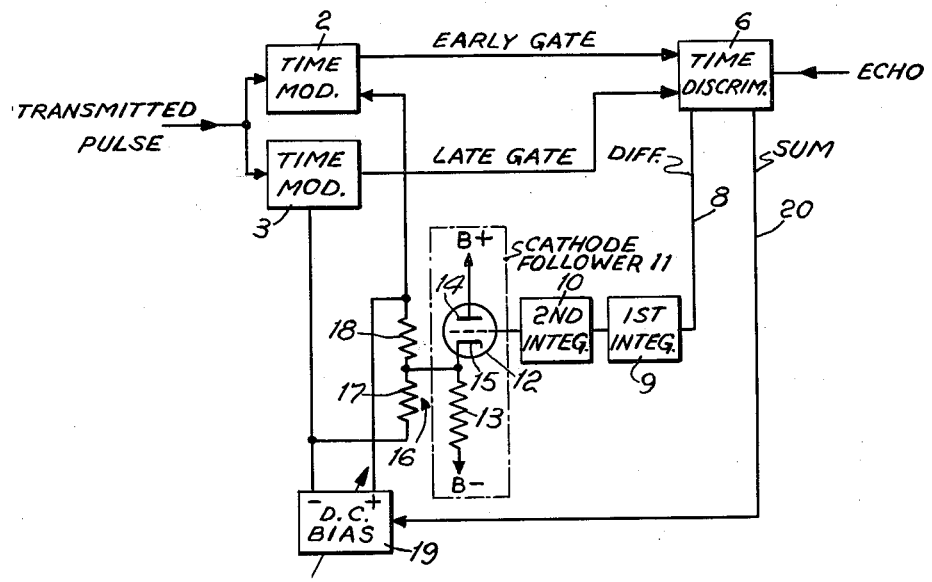

June 19, 1962  J. J. B. LAIR  3,040,312

AUTOMATIC ECHO PULSE RECAPTURE CIRCUIT
Filed Feb. 10, 1960

INVENTOR.
JULIEN J. B. LAIR
BY
ATTORNEY

United States Patent Office 3,040,312
Patented June 19, 1962

3,040,312
AUTOMATIC ECHO PULSE RECAPTURE
CIRCUIT
Julien J. B. Lair, Glen Ridge, N.J., assignor to International Telephone and Telegraph Corporation, Nutley, N.J., a corporation of Maryland
Filed Feb. 10, 1960, Ser. No. 7,919
7 Claims. (Cl. 343—7.3)

This invention relates to a radio echo detection system and particularly to means for use with radar systems for automatically recapturing a lost target echo and is a continuation-in-part of application, Serial No. 468,429, filed November 12, 1954, now Patent No. 2,979,712.

The usual range tracking radar apparatus includes a transmitter which emits signals reflected by a target and a receiver to detect the reflected signals and supply an indicator whenever a reflection is received. Such an indicator may be provided with a time sweep whereby the position of the indication produced in response to a reflection is indicative of the time lapse between transmission of the signal and reception of the echo and is therefore indicative of range. Range tracking apparatus gates the radar receiver, i.e., renders the receiver or a circuit thereof responsive to the application of a delayed gate applied in time coincidence with the arrival of the reflected echo from a selected target thereby permitting the generation of an error voltage to take place with respect to the positioning of the tracking pulse (which may gate the receiver) and the echo pulse. The error signal is fed back to the range gate generator circuit to vary the time of application (delay) of the gating pulse to the receiver so that as the selected target varies in range with respect to the radar apparatus, the delay in the application of the tracking pulse will also vary. Furthermore such range tracking radar apparatus are usually provided with "memory circuits" which automatically varies the delay in the application of the tracking pulse in accordance with the preceding rate of application so that if for some reason the echo signal is lost, the gate applied to the receiver continues to vary at the proper rate to cause it to lie in time coincidence with the echo signal when it returns.

However, it should be quite apparent that the coincidence of the gating pulse and the returned echo pulse is dependent upon the length of time that the echo is lost, that is, the memory tracking circuit will be dependent upon the accuracy of the range rate measurement and the absence of any change or very small change in the range rate by the selected target.

After a predetermined period of time the operator of the radar apparatus must assume that the cumulative errors due to noise or other causes have introduced a total error on the gating pulse which would make time coincidence improbable and therefore the operator of the radar system commences to search in range for the selected target echo. Searching is usually accomplished by causing the tracking or gating pulse to have its maximum or minimum delay (furthest or nearest range) and then varying the time delay to the other end of the range (time delay) scale attempting to locate the echo of the selected target. The search operation proceeding from one range extreme to other necessarily occupies a long period of time during which it is probable that the selected target will completely evade the radar search. During the tracking phase, the time duration of the range gate pulse (which is not the tracking pulse) is long enough so that the intermediate frequency amplifier of the receiver is activated (early enough and late enough) to pass the signal to be tracked. During the time periods between these range gate pulses, the RF amplifier is inoperative. It is desirable to provide a radar system wherein the receiver is always open for the reception of echo signals and no range gate circuitry is required but tracking pulses are always required.

One of the objects of this invention, therefore, is to provide a circuit for the automatic recapture of an echo signal for use with radar system apparatus.

Another object is to provide a circuit for use with radar system apparatus in which a lost echo signal is recaptured quickly and automatically without the use of a conventional range gate circuit.

A feature of this invention is the establishment of a pair of recapture pulses which vary in time position to quickly recapture a lost echo pulse.

Figure 2:
Figure 2:
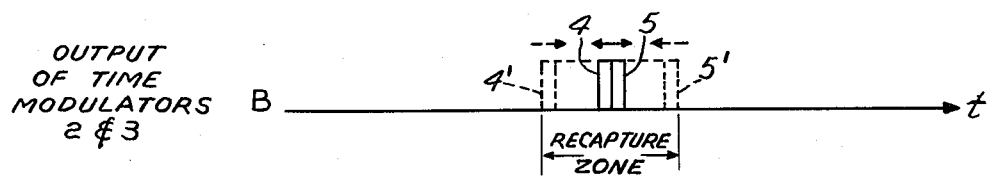

The above-mentioned and other features and objects of this invention will become more apparent by reference to the following description taken in conjunction with the accompanying drawings, in which:

FIG. 1 is a schematic diagram in block form of one embodiment of the automatic echo recapture circuit of my invention in which a pair of automatic recapture pulses are established; and FIG. 2 is a series of curves helpful in the explanation of the block diagram shown in FIG. 1.

Referring to FIG. 1, a simplified schematic diagram in block form of the embodiment of an automatic echo recapture circuit in accordance with the principles of this invention is shown wherein a pair of recapture pulses are oppositely varied in time position in order to more quickly reacquire a lost target echo pulse. The radar transmitted pulse input 1, shown in FIG. 2, curve A, is coupled from the transmitting portion of a cooperating tracking radar system (not shown) to trigger a pair of time modulators 2 and 3. Time modulators 2 and 3 each include a pulse generator and a threshold circuit to displace in time the pulse output of the pulse generator. Time modulators 2 and 3 generate respectively an early gate pulse 4 and a late gate pulse 5 as shown in FIG. 2, curve B, which are used both for search and tracking functions as will be described later. The early gate and late gate signals from the time modulators 2 and 3 are coupled to a time discriminator circuit 6 along with the target echo pulse 7 detected by the receiver of the tracking radar system and shown in curve A, FIG. 2. As is usual in tracking radar systems, the time discriminator circuit 6 generates an error signal responsive to the difference in time between the target echo pulse and the early and late gate pulses 4 and 5. This difference or error signal is coupled over line 8 to a first integrator circuit 9, which in accordance with usual practice may be termed a velocity memory circuit, the output of which is proportional to rate of change of range. This output of first integrator 9 is coupled to a second integrator or range memory circuit 10. The second integrator circuit 10, whose output comprises the time information or in other words the output of the velocity memory circuit 9 is proportional to the range of the selected target (at any instant of time) and includes as its input the information of rate of change of range comprising the output of integrator 9. The output of the second integrator circuit 10 is coupled to a cathode follower circuit 11 including an electron discharge device 12. The output of the second integrator circuit 10 is coupled to the grid of the electron discharge device 12. A cathode resistor 13 is coupled to a negative voltage and the plate 14 is coupled to a positive voltage, as in the usual cathode follower arrangement. The output for the cathode follower circuit 11 is coupled from the cathode 15 to a tapped resistance 16 or the junction of two equal resistances 17 and 18. The positive output of the tapped resistance 16 is provided by coupling the resistor 18 to the positive terminal of a D.C. bias source 19 and to the time modulator 2 to vary the time delay between the input transmitted pulse and the output early gate. The negative output of tapped resistance 16 is provided by coupling the resistor 17 to the negative terminal of D.C. bias source 19 and to the time modulator 3 to vary the time delay between the transmitted pulse and the output late gate. As the early and late gate time position varies from the target echo pulse position, the output of the second integrator 10 varies causing a variation in the voltage bias coupled into time modulators 2 and 3 until the echo pulse 7 is centered between the early gate and late gate and the error signal output 8 of time discriminator 6 is reduced to zero again. The second output of time discriminator 6 comprises the signal representing the sum of the outputs from the early and late gates and echo pulses. This sum is coupled over line 20 to D.C. bias source 19 which couples an additional varying positive bias to time modulator 2 and an additional varying negative bias to time modulator 3. (The average tracking voltage being applied by cathode 15.) When the sum output of time discriminator 6 decreases then the output of bias source 19 increases. When the early and late gates 4 and 5 track the target echo pulse 7 the output of D.C. bias source 19 is minimum or zero. However, if the early gate and late gates 4 and 5 are positioned in time in such a manner as to completely miss the target echo pulse 7, search begins and the output of time discriminator 6 indicated by the sum voltage coupled over line 20 starts to vary the D.C. bias output of source 19 causing the early and late gates 4 and 5 to vary oppositely in time and more to the position 4' and 5', as shown in FIG. 2, curve B. As the early and late gates 4 and 5 are varied in time, if one of the gates becomes time coincident with the target echo 7, the comparison in time discriminator 6 will cause a bias to be applied through the integrator circuits 9 and 10 and through the cathode follower 12 and tapped resistor 16 to cause the early and late gates to reacquire the target echo.

In normal tracking the bias on time modulators 2 and 3 are arranged so that the early gate and the late gate will be adjacent to each other as shown in FIGURE 2, curve B. The bias on time modulator 2 is equal to the voltage applied to resistor 13 plus half of the voltage applied to tapped resistance 16. Similarly the bias on time modulator 3 is equal to the voltage applied to resistor 13 plus the other half of the voltage applied to tapped resistance 16. The two half voltages are opposite in sign. It has been assumed that when a voltage increases on a time modulator, the resulting displacement of the gate is toward an early position. The reciprocal is true for a decrease in voltage.

Consequently, when the sum output of time discriminator 6 (wire 20) decreases, the voltage across D.C. bias 19 should increase. Then the early gate 4 and the late gate 5 will be pushed away from each other as shown on FIGURE 2, curve C. As soon as one of the two separated gates 4' and 5' will be in coincidence with the reappearing echo, the voltage on wire 20 will increase. Then the D.C. bias will decrease and the two separated pulses will move toward each other until they become adjacent. This return to normal is greatly helped also by the simultaneous action of the difference circuit (wire 8, first and second integrators 9 and 10 and cathode follower 11).

The polarity of D.C. bias source 19 coupled to time modulators 2 and 3 can be oppositely poled when they are coupled to time modulators 13 and 14 to cause the recapture pulses to proceed from the extreme edges of the recapture zone to the center. Thus, as shown in curve B, FIG. 2, early and late gates 4 and 5 can be caused to vary in time from the dotted positions as shown toward the center.

While I have described above the principles of my invention in connection with specific apparatus, it is to be clearly understood that this description is made only by way of example and not as a limitation to the scope of my invention as set forth in the objects thereof and in the accompanying claims.

I claim:

1. A radar system having a radar pulse transmitter and a receiver for detecting reflected target echoes; comprising means to generate early and late gate pulses, means to compare in time said early and late gate pulses and said echoes and produce a difference output signal and a sum output signal responsive to said comparison, means responsive to said difference output signal to vary the occurrence of said early and late gate pulses and means responsive to said sum output signal to vary the time difference therebetween to cause substantially equal coincidence with said echoes.

2. A radar system having a radar pulse transmitter and a receiver for detecting reflected target echoes; comprising first and second time modulators to produce respectively early and late gate pulses in response to the transmitted pulse of said transmitter, a time discriminator, means coupling said echoes and said early and late gate pulses to said time discriminator to derive a sum voltage and a difference error voltage output therefrom responsive to the comparison of said echoes with said early and late gate pulses, and means responsive to said sum and difference voltages to vary the time of occurrence of said early and late gate pulses of said first and second time modulators and to change the time difference between said early and late gate pulses until said early and late gate pulses coincide substantially with said echoes.

3. A radar system having a radar pulse transmitter and a receiver for detecting reflected target echoes; comprising first and second time modulators to produce respectively early and late gate pulses in response to the transmitted pulse of said transmitter, a time discriminator, means coupling said echoes and said early and late gate pulses to said time discriminator to derive a sum voltage and a difference error voltage output therefrom responsive to the comparison of said echoes with said early and late gate pulses, a source of direct current bias coupled to said first and second time modulators and means coupling said sum and difference voltages to said bias source to vary the output of said source whereby the time of occurrence of said early and late gate pulses are caused to vary and the time difference between said early and late gate pulses is caused to change until said early and late gate pulses coincide substantially with said echoes.

4. A radar system having a radar pulse transmitter and a receiver for detecting reflected target echoes; comprising first and second time modulators to produce respectively early and late gate pulses in response to the transmitted pulse of said transmitter, a time discriminator, means coupling said echoes and said early and late gate pulses to said time discriminator to derive a sum voltage and a difference error voltage output therefrom responsive to the comparison of said echoes with said early and late gate pulses, integrating means, means coupling said difference voltage to said integrating means, a source of direct current bias coupled to said first and second time modulators, means coupling the output of said integrating means to said bias source whereby the time of occurrence of said early and late gate pulses of said first and second time modulators are caused to vary in response to the output of said integrating means, means coupling the sum voltage output of said time discriminator to said source of direct current bias to vary the output of said source whereby the time difference between said early and late gate pulses is caused to change until said early and late gate pulses coincide substantially with said echoes.

5. A radar system having a radar pulse transmitter and a receiver for detecting reflected target echoes; comprising first and second time modulators to produce respectively early and late gate pulses in response to the transmitted pulse of said transmitter, a time discriminator, means coupling said echoes and said early and late gate pulses to said time discriminator to derive a sum voltage and a difference error voltage output therefrom responsive to the comparison of said echoes with said early and late gate pulses, integrating means, means coupling said difference voltage to said integrating means, a resistance circuit, means coupling the output of said integrating means to said resistance circuit, a source of direct current bias coupled to said first and second time modulators, means coupling said resistance circuit to said bias source whereby the time of occurrence of said early and late gate pulses of said first and second time modulators are caused to vary in response to the output of said cathode, means coupling the sum voltage output of said time discriminator to said source of direct current bias to vary the output of said source whereby the time difference between said early and late gate pulses is caused to change until said early and late gate pulses coincide substantially with said echoes.

6. A radar system having a radar pulse transmitter and a receiver for detecting reflected target echoes; comprising first and second time modulators to produce respectively early and late gate pulses in response to the transmitted pulse of said transmitter, a time discriminator, means coupling said echoes and said early and late gate pulses to said time discriminator to derive a sum voltage and a difference error voltage output therefrom responsive to the comparison of said echoes with said early and late gate pulses, integrating means, means coupling said difference voltage to said integrating means, a resistance circuit, a cathode follower circuit coupling the output of said integrating means to said resistance circuit, a source of direct current bias coupled to said first and second time modulators, means coupling said resistance to said bias source whereby the time of occurrence of said early and late gate pulses of said first and second time modulators are caused to vary in response to the output of said cathode, means coupling the sum voltage output of said time discriminator to said source of direct current bias to vary the negative and positive output of said source whereby the time difference between said early and late gate pulses is caused to change until said early and late gate pulses coincide substantially with said echoes.

7. A radar system having a radar pulse transmitter and a receiver for detecting reflected target echoes; comprising first and second time modulators to produce respectively early and late gate pulses in response to the transmitter pulse of said transmitter, a time discriminator, means coupling said echoes and said early and late gate pulses to said time discriminator to derive a sum voltage and a difference error voltage output therefrom responsive to the comparison of said echoes with said early and late gate pulses, a first integrator, means coupling said difference error voltage to said first integrator, an electron discharge device, a second integrator coupled to the output of said first integrator, means coupling the output of said second integrator to the control grid of said discharge device, a negative voltage coupled to the cathode of said discharge device, a positive voltage coupled to the anode of said discharge device, resistance circuit, means coupling the output of said cathode to the midpoint of said resistance circuit, a source of direct current bias, means coupling one output of said resistance circuit to the positive terminal of said direct current bias and to said first time modulator, means coupling the other output of said resistance circuit to the negative terminal of said direct current bias and to said second time modulator whereby the time of occurrence of said early and late gate pulses of said first and second time modulators are caused to vary in response to the output of said cathode, means coupling the sum voltage output of said time discriminator to said source of direct current bias to vary the negative and positive output of said source whereby the time difference between said early and late gate pulses is caused to change until said early and late gate pulses coincide substantially with said echoes.

References Cited in the file of this patent
UNITED STATES PATENTS
2,746,032    Moore _____ May 15, 1956